(12) United States Patent
Straub

(10) Patent No.: US 8,468,998 B2
(45) Date of Patent: Jun. 25, 2013

(54) ENGINE HAVING FUEL INJECTION INDUCED COMBUSTION CHAMBER MIXING

(75) Inventor: Robert D. Straub, Lowell, MI (US)

(73) Assignee: GM Global Technology Operations LLC

( * ) Notice: Subject to any disclaimer, the term of this patent is extended or adjusted under 35 U.S.C. 154(b) by 576 days.

(21) Appl. No.: 12/752,246

(22) Filed: Apr. 1, 2010

(65) Prior Publication Data
US 2011/0239983 A1  Oct. 6, 2011

(51) Int. Cl.
F02F 3/24 (2006.01)
F02B 3/00 (2006.01)

(52) U.S. Cl.
USPC ............ 123/298; 123/301; 123/305; 123/307

(58) Field of Classification Search
USPC .................................. 123/298, 301, 305, 307
See application file for complete search history.

(56) References Cited

U.S. PATENT DOCUMENTS

| | | | | |
|---|---|---|---|---|
| 2,183,284 A * | 12/1939 | Wiebicke | | 239/460 |
| 4,867,128 A * | 9/1989 | Ragg et al. | | 123/531 |
| 5,868,112 A * | 2/1999 | Mahakul et al. | | 123/263 |
| 5,875,743 A * | 3/1999 | Dickey | | 123/25 C |
| 6,575,132 B1 * | 6/2003 | Ernst et al. | | 123/295 |
| 6,748,872 B2 * | 6/2004 | Parrish | | 123/305 |
| 6,840,209 B2 * | 1/2005 | Shimazaki | | 123/276 |
| 7,040,279 B2 * | 5/2006 | Regueiro | | 123/254 |
| 7,431,012 B1 * | 10/2008 | Glenn et al. | | 123/299 |
| 7,685,990 B2 * | 3/2010 | Dingle | | 123/299 |
| 7,861,685 B2 * | 1/2011 | Sono et al. | | 123/298 |
| 7,909,271 B2 * | 3/2011 | Cavanagh et al. | | 239/533.12 |
| 2003/0005907 A1 * | 1/2003 | Nakakita et al. | | 123/295 |
| 2003/0047159 A1 * | 3/2003 | Shimazaki | | 123/276 |
| 2003/0084869 A1 * | 5/2003 | Parrish | | 123/305 |
| 2003/0084870 A1 * | 5/2003 | Parrish | | 123/305 |
| 2003/0226538 A1 * | 12/2003 | Eckerle et al. | | 123/298 |
| 2007/0261667 A1 * | 11/2007 | Altenschmidt et al. | | 123/298 |
| 2008/0308656 A1 * | 12/2008 | Cavanagh et al. | | 239/533.3 |
| 2009/0025681 A1 * | 1/2009 | Takahashi et al. | | 123/305 |

FOREIGN PATENT DOCUMENTS

EP   2039905 A1   3/2009

* cited by examiner

*Primary Examiner* — Erick Solis
(74) *Attorney, Agent, or Firm* — Harness, Dickey & Pierce, P.L.C.

(57) ABSTRACT

An engine assembly may include an engine structure, a piston, and a direct injection fuel system. The engine structure may define a cylinder bore and an intake port in communication with the cylinder bore and adapted to mitigate intake air swirl within the cylinder bore. The piston may be disposed within the cylinder bore for a reciprocal stroke between a top dead center position and a bottom dead center position. The piston may define an annular recess portion in an axial end surface thereof. The direct injection fuel system may include a fuel injector that provides a fuel spray to a combustion chamber defined by the piston and the cylinder bore. The fuel spray may define an annular plume intersecting the annular recess portion in the piston when the piston is in an injection position within twenty percent of the reciprocal stroke from the top dead center position.

7 Claims, 4 Drawing Sheets

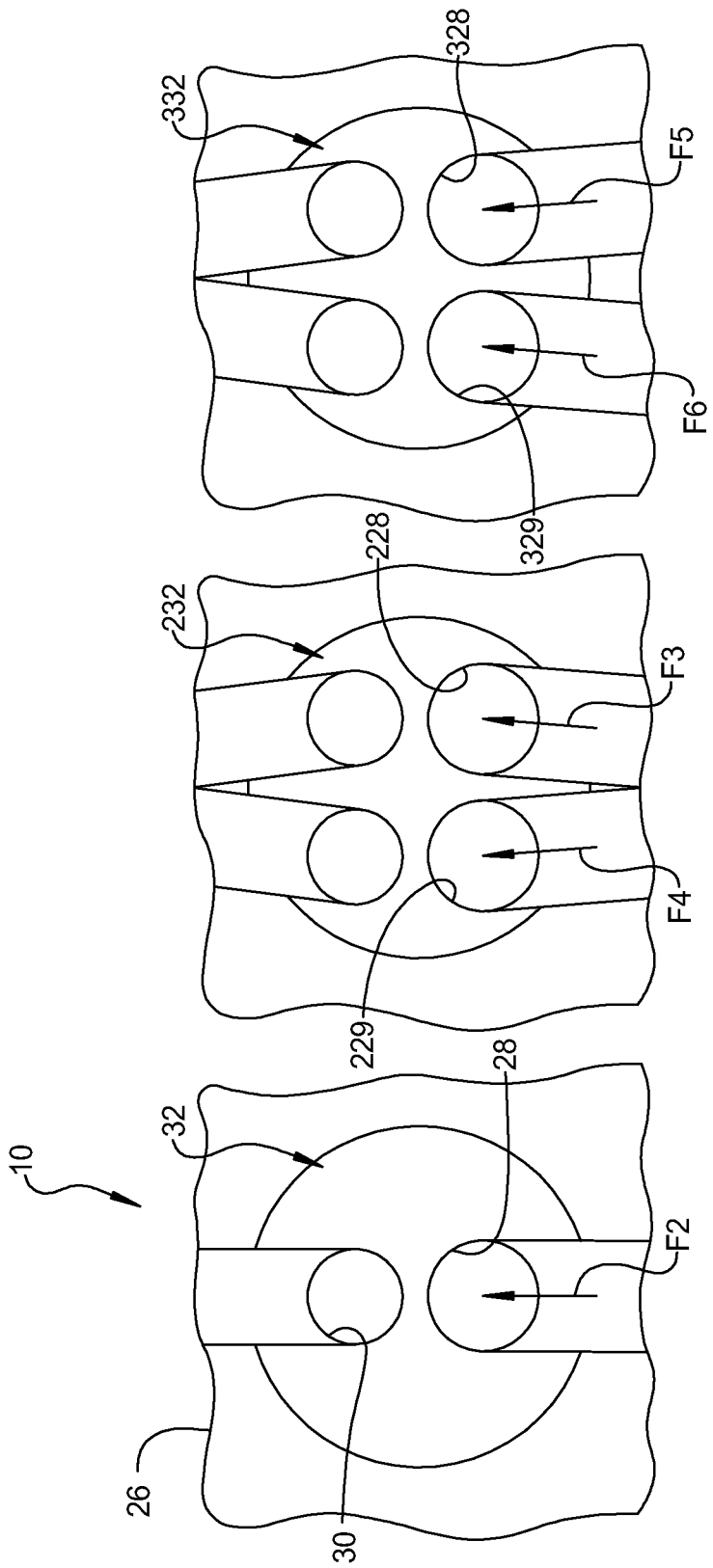

ENGINE HAVING FUEL INJECTION INDUCED COMBUSTION CHAMBER MIXING

FIELD

The present disclosure relates to internal combustion engines including direct injection fuel systems.

BACKGROUND

This section provides background information related to the present disclosure which is not necessarily prior art.

Engine assemblies may include direct engine fuel systems providing a fuel supply directly to a combustion chamber of the engine. Typically, the direct injection fuel systems may include a centrally located fuel injector. During the injection, the fuel injector may provide multiple radial fuel jets directed toward the combustion chamber walls. The orientation of the fuel injector and the resulting fuel spray may result in the fuel hitting the combustion chamber walls and therefore limiting mixing within the combustion chamber.

SUMMARY

An engine assembly may include an engine structure, a piston, and a direct injection fuel system. The engine structure may define a cylinder bore and an intake port in communication with the cylinder bore and adapted to mitigate intake air swirl within the cylinder bore. The piston may be disposed within the cylinder bore for a reciprocal stroke between a top dead center position and a bottom dead center position. The piston may define an annular recess portion in an axial end surface thereof. The direct injection fuel system may include a fuel injector that provides a fuel spray to a combustion chamber defined by the piston and the engine structure. The fuel spray may define an annular plume intersecting the annular recess portion in the piston when the piston is in an injection position within twenty percent of the reciprocal stroke from the top dead center position.

A method may include providing a direct injection fuel injector in communication with a combustion chamber of an internal combustion engine defined by a cylinder bore in an engine structure and a piston disposed in the cylinder bore for a reciprocal stroke between a top dead center position and a bottom dead center position. The method may further include providing intake air flow to the combustion chamber and mitigating intake air swirl within the combustion chamber. A fuel spray may be injected from the fuel injector directly into the combustion chamber. The fuel injected into the combustion chamber may define an annular plume directed toward an annular recess portion in an axial end surface of the piston when the piston is in an injection position within twenty percent of the reciprocal stroke from the top dead center position.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only and are not intended to limit the scope of the present disclosure in any way.

FIG. 2 is a schematic illustration of a first intake and exhaust port arrangement according to the present disclosure;

FIG. 3 is a schematic illustration of a second intake and exhaust port arrangement according to the present disclosure;

FIG. 4 is a schematic illustration of a third intake and exhaust port arrangement according to the present disclosure;

Corresponding reference numerals indicate corresponding parts throughout the several views of the drawings.

DETAILED DESCRIPTION

Examples of the present disclosure will now be described more fully with reference to the accompanying drawings. The following description is merely exemplary in nature and is not intended to limit the present disclosure, application, or uses.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

When an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Figure 1:
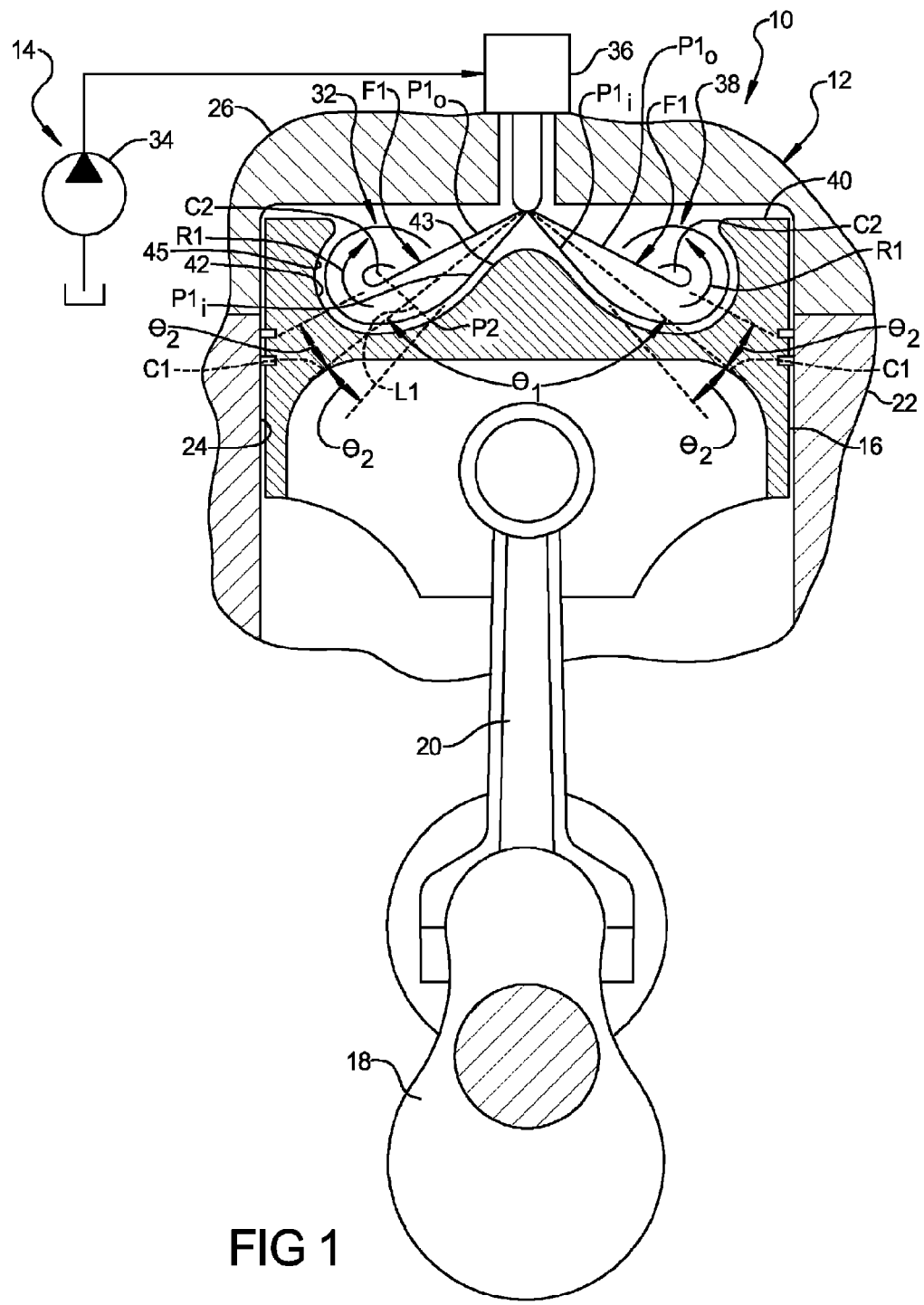
FIG. 1 is a schematic section view of an engine assembly according to the present disclosure.

With reference to FIGS. 1 and 2, an internal combustion engine assembly 10 may include an engine structure 12, a direct injection fuel system 14 and a piston 16 coupled to a crankshaft 18 by a connecting rod 20. The engine structure 12 may include a cylinder block 22 defining a cylinder bore 24 and a cylinder head 26 defining intake and exhaust ports 28, 30. The piston 16 may be disposed within the cylinder bore 24 and may be reciprocally displaceable between a top dead center (TDC) position and a bottom dead center (BDC) position to drive rotation of the crankshaft 18. The present disclosure applies equally to engines including any number of piston/cylinder arrangements as well as overhead cam and cam in block arrangements. The present disclosure also applies equally to diesel and direct injection gasoline engines.

The piston 16 and the engine structure 12 cooperate to define a combustion chamber 32. The direct injection fuel system 14 includes a fuel pump 34 providing a pressurized fuel supply to a direct injection fuel injector 36. In the present non-limiting example, the fuel provided to the direct injection fuel injector 36 may be at an operating pressure of at least one hundred mega Pascal (100 MPa). The direct injection fuel injector 36 is in direct communication with the combustion chamber 32 forming a direct injection arrangement. The direct injection fuel injector 36 may be incorporated into a fuel rail (not shown) having a plurality of direct injection fuel injectors.

The direct injection fuel injector 36 may extend axially into the combustion chamber 32. The piston 16 may define a torroidal combustion bowl 38 in an axial end surface 40 facing the direct injection fuel injector 36. The torroidal combustion bowl 38 may include an annular recess portion 42 defined radially between inner and outer radial surfaces 43, 45. The direct injection fuel injector 36 may be located centrally relative to the combustion chamber 32 and may direct a fuel spray (F1) into the annular recess portion 42 when the piston 16 is in an injection position within twenty percent of the reciprocal stroke from the TDC position. The fuel spray (F1) may define an annular plume.

Figure 5:
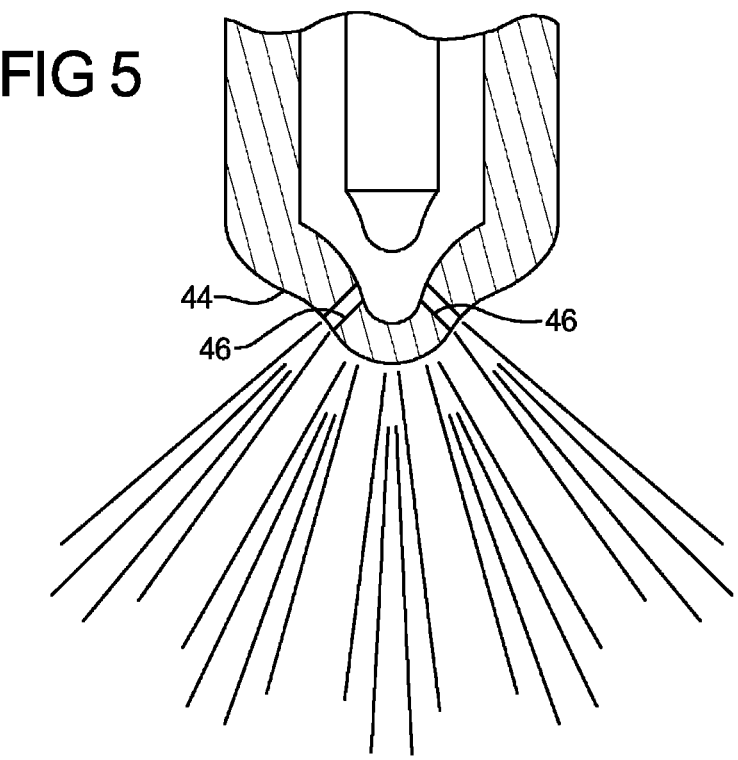
FIG. 5 is a schematic illustration of a first fuel injector nozzle according to the present disclosure.
Figure 6:
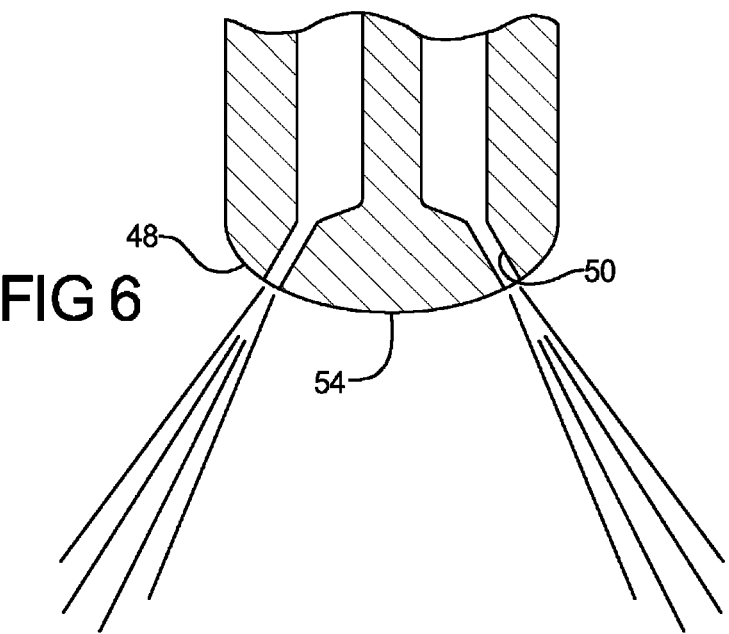
FIG. 6 is a schematic illustration of a second fuel injector nozzle according to the present disclosure.

In a first non-limiting example, the fuel spray (F1) includes multiple plumes. The multiple plumes may be generated by a multi-hole nozzle 44 of the direct injection fuel injector 36 defining a plurality of apertures 46 as illustrated in FIG. 5. The multi-hole nozzle 44 may include at least ten apertures 46, and more specifically at least eighteen apertures 46. The multiple plumes may include a discrete series of plumes circumferentially spaced from one another to form the annular plume. However, it is understood that the fuel spray (F1) may alternatively include a continuous annular plume. The continuous annular plume may be generated by a nozzle 48 of the direct injection fuel injector 36 defining a continuous annular opening 50 and a poppet valve 54 as illustrated in FIG. 6. Alternatively, a pintle valve may be used in combination with the continuous annular opening 50 to create the continuous annular plume.

In either arrangement, the annular plume formed by the fuel spray (F1) defines an annular centerline (C1) between inner and outer radial peripheries ($P1_i$, $P1_o$) of the fuel spray (F1). The annular centerline (C1) of the fuel spray (F1) may extend into the torroidal combustion bowl 38 between an annular center (C2) of the annular recess portion 42 and the inner radial surface 43 of the annular recess portion 42. The annular center (C2) may define a torroid center for the torroidal combustion bowl 38.

A line (L1) perpendicular to the annular centerline (C1) of the fuel spray (F1) and through the annular center (C2) may intersect the inner radial surface 43 at a point (P2). The fuel spray (F1) may define a spray angle ($\theta_1$). The spray angle ($\theta_1$) may be defined as the included angle of the annular centerline (C1). The inner radial periphery ($P1_i$) may extend in a direction toward the piston 16 at an angle of ($\theta_2$) relative to the annular centerline (C1) and the outer radial periphery ($P1_o$) may extend toward the piston 16 at the angle ($\theta_2$) relative to the annular centerline (C1).

The spray angle ($\theta_1$) may be adjusted to have the inner radial periphery ($P1_i$) extend in a direction toward the piston 16 and radially between the annular centerline (C1) and the point (P2). By way of non-limiting example, the inner radial periphery ($P1_i$) may extend in a direction toward the piston 16 intersecting the point (P2) on the inner radial surface 43 of the piston 16 when the piston is in the injection position. It is understood that the spray angle ($\theta_1$) may be adjusted to a position for a desired overall operation at all loads and speeds as a result of the angle ($\theta_2$) varying slightly with injection pressure and the fuel-air mass in the combustion chamber 32 (combustion chamber charge density).

Figure 7:
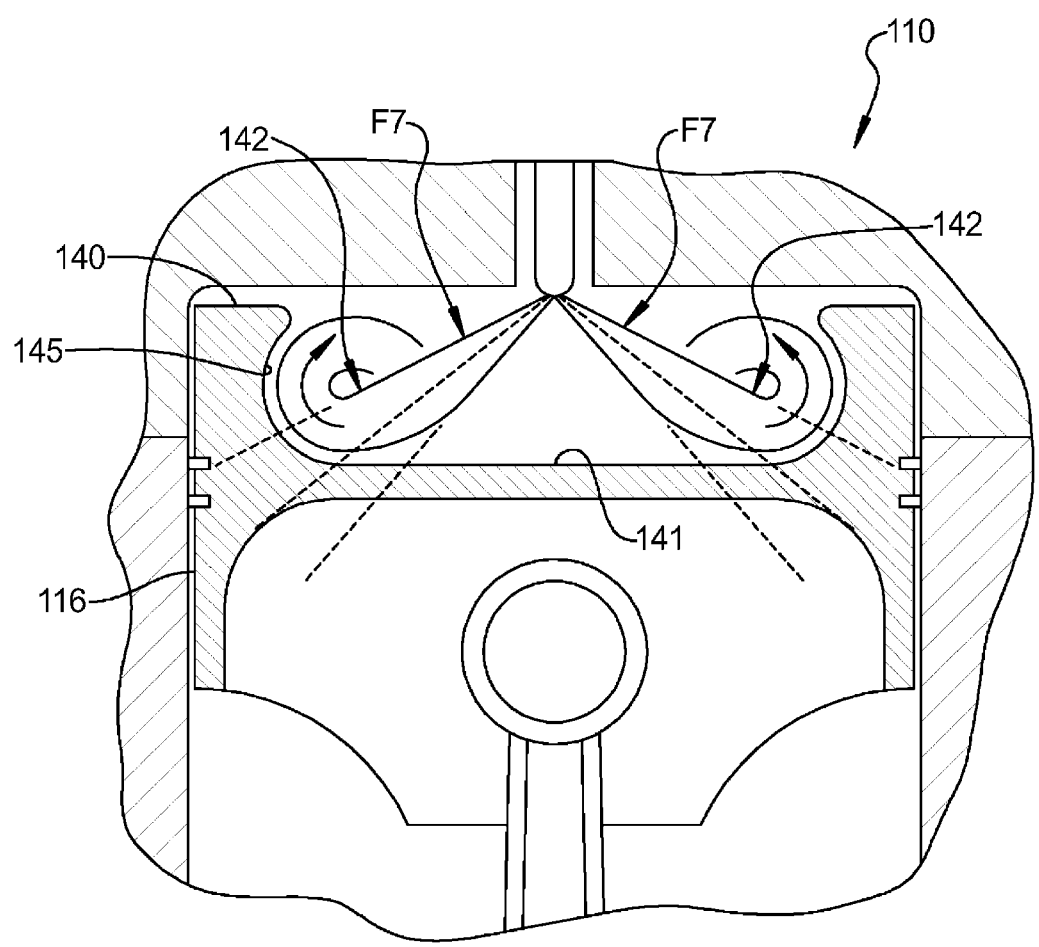
FIG. 7 is a schematic section view of an alternate engine assembly according to the present disclosure.

An alternate engine assembly 110 is shown in FIG. 7. The engine assembly 110 may be similar to the engine assembly 10 with the exceptions noted below. The engine assembly 110 may include a generally continuous central recess 141 in an axial end surface 140 of the piston 116. The central recess 141 may have a generally continuous radial extent radially within the outer radial surfaces 145 defining the central recess 141. The central recess 141 may include an annular recess portion 142 at an outer radial periphery thereof. The fuel spray (F7) may be targeted toward the annular recess portion 142 in a manner similar to the direction of the fuel spray (F1) relative to the annular recess portion 42 of FIG. 1. More specifically, the fuel spray (F7) may be targeted as if the radial inner surface 43 of the torroidal combustion bowl 38 of FIG. 1 were present.

The high operating pressure of the fuel spray (F1) and the orientation of the fuel spray (F1) relative to the combustion chamber 32 may create a rolling fuel spray pattern (rolling torroidal flow) within the combustion chamber 32 and provide mixing. The fuel spray (F1) may form a rotational fuel spray, rotating about the annular center (C2) of the annular recess portion 42 in a rotational direction (R1) from the inner radial surface 43 of the annular recess portion 42 axially toward the piston 16 and to the outer radial surface 45 of the annular recess portion 42. The rotational direction (R1) may be defined about an axis generally perpendicular to the reciprocal direction of the piston 16. By way of non-limiting example, the fuel delivered to the combustion chamber at the start of the injection event may travel at least three hundred and sixty degrees in the rotational direction (R1) by the end of the injection event for a corresponding combustion event (in-cylinder combustion corresponding to a power stroke) under high load operation.

The intake port 28 may be arranged to minimize swirl flow generated by intake air flow. In the non-limiting example of FIG. 2, the engine assembly 10 includes a single intake port 28 for the combustion chamber 32. The intake port 28 may define a flow path (F2) toward a central region of the combustion chamber 32 to mitigate intake air swirl.

FIG. 3 illustrates an alternate non-limiting example including first and second intake ports 228, 229 for the combustion chamber 232. The first and second intake ports 228, 229 may be oriented generally opposite one another defining intake air flow paths (F3, F4) extending radially outward from one another. Alternatively, as seen in the non-limiting example of FIG. 4, first and second intake ports 328, 329 for the combustion chamber 332 may be oriented generally opposite one another defining intake air flow paths (F5, F6) extending radially inward toward one another.

The equal and opposite orientation of the first intake port 228, 328 relative to the second intake port 229, 329 counteracts the tendency for intake air swirl within the combustion chamber 232, 332. Therefore, the mixing of air and fuel within the combustion chamber is primarily generated by the fuel spray (F1).

What is claimed is:

1. An engine assembly comprising:

an engine structure defining a cylinder bore and an intake port in communication with the cylinder bore and adapted to mitigate intake air swirl within the cylinder bore;

a piston disposed within the cylinder bore for a reciprocal stroke between a top dead center position and a bottom dead center position, the piston including a torroidal combustion bowl defining an annular recess portion in an axial end surface thereof; and a direct injection fuel system including a fuel injector that provides a fuel spray to a combustion chamber defined by the piston and the engine structure, the fuel spray defining a continuous annular plume intersecting the annular recess portion in the piston when the piston is in an injection position within 20 percent of the reciprocal stroke from the top dead center position, wherein the annular plume defines an inner radial periphery and an outer radial periphery, an annular centerline of the annular plume between the inner and outer radial peripheries extending radially inward relative to an annular center of the annular recess portion when the piston is in the injection position to define a rolling fuel spray pattern in a rotational direction from an inner radial surface of the annular recess portion to an outer radial surface of the annular recess portion.

2. The engine assembly of claim 1, wherein the fuel injector includes a poppet nozzle defining a continuous annular opening providing the continuous annular plume.

3. The engine assembly of claim 1 wherein the fuel injector includes a nozzle having at least 18 holes defining a discrete series of plumes to form the annular plume.

4. The engine assembly of claim 1, wherein the engine structure defines a single intake port in communication with the combustion chamber and directed toward a central region of the combustion chamber to mitigate intake air swirl.

5. The engine assembly of claim 1, wherein the engine structure defines first and second intake ports in communication with the combustion chamber and oriented generally opposite one another directing intake air flow in opposite directions to mitigate intake air swirl.

6. The engine assembly of claim 1, wherein the fuel injector is centrally oriented relative to the combustion chamber.

7. The engine assembly of claim 1, wherein the fuel injector is in fluid communication with a pressurized fuel supply at an operating pressure of at least 100 mega Pascal (MPa).

* * * * *